US005098512A

United States Patent [19]

Naitou et al.

[11] Patent Number: 5,098,512

[45] Date of Patent: Mar. 24, 1992

[54] HEATING AMOUNT ADJUSTING DEVICE FOR A PREHEATER IN A CORRUGATED CARDBOARD PRODUCING MACHINE

[75] Inventors: Minoru Naitou; Shinji Watanabe, both of Kasugai; Toshihiko Yasui, Owariasahi, all of Japan

[73] Assignee: Isowa Industry Co., Ltd., Aichi, Japan

[21] Appl. No.: 484,363

[22] Filed: Feb. 26, 1990

[30] Foreign Application Priority Data

Mar. 6, 1989 [JP] Japan ................................ 1-25346[U]

[51] Int. Cl.[5] ........................ B32B 31/08; B32B 31/12; C09J 5/02

[52] U.S. Cl. .................................... 156/470; 156/210; 156/322; 156/499

[58] Field of Search ............... 156/499, 470, 208, 205, 156/462, 322, 210; 219/469, 470, 244; 165/89; 226/174, 175, 190; 34/132

[56] References Cited

U.S. PATENT DOCUMENTS

| | | | |
|---|---|---|---|
| 2,788,587 | 4/1957 | Dsenis | 219/469 X |
| 3,825,724 | 7/1974 | Kingsley et al. | 219/469 |
| 4,056,417 | 11/1977 | League, IV | 156/205 X |
| 4,115,181 | 9/1978 | Fujii et al. | 156/499 X |

FOREIGN PATENT DOCUMENTS

| | | | |
|---|---|---|---|
| 977498 | 12/1964 | United Kingdom | 226/174 |

*Primary Examiner*—Michael W. Ball

*Assistant Examiner*—Michele K. Yoder

*Attorney, Agent, or Firm*—Cushman, Darby & Cushman

[57] ABSTRACT

A corrugated cardboard producing machine has a preheater for heating a corrugated cardboard sheet of original paper or single face type corrugatd cardboard sheet in each of various processing stages for producing a corrugated cardboard by bonding a liner paper onto a corrugated central core paper. The preheater is provided with a lap amount adjusting tool whose insertion amount between a circumference of a roll of the preheater and the original paper or the single face type corrugated cardboard is adjustable. The lap amount adjusting tool is movable along the circumference of the roll of the preheater.

5 Claims, 6 Drawing Sheets

HEATING AMOUNT ADJUSTING DEVICE FOR A PREHEATER IN A CORRUGATED CARDBOARD PRODUCING MACHINE

BACKGROUND OF THE INVENTION

The present invention relates to a heating amount adjusting device for a preheater used in a corrugated cardboard producing machine.

In general, a corrugated cardboard producing machine operates as follows. As shown in FIG. 9, an original paper 2 fed out of a mill roll stand 1 is supplied as a liner paper to a single facer 5 through a splicer 3 and a preheater for paper splicing. On the other hand, an original paper 9 is fed as a central core paper from another mill roll stand 6 to the single facer 5 through a splicer 7 and a preconditioner 8 for wetting and adjusting a humidity. In the single facer 5, the original paper 9 is corrugated and formed into the central core paper, and the original paper 2 for the above-described liner paper is attached to the central core paper, thereby producing a single face corrugated cardboard sheet 10, i.e., a one-sided corrugated cardboard. In the corrugated cardboard producing machine, there is provided another producing system 12 having the same structure as that of the foregoing system for producing a corrugated cardboard sheet 11. The respective corrugated cardboard sheets 10 and 11 of the single face type are bonded together through an overhead bridge conveyor 13, a preheater 14 and a gluing machine 15. In addition, a liner paper 16 is also bonded to the corrugated cardboard sheets, to thereby produce a double face type corrugated cardboard sheet, i.e., a so called two-sided corrugated cardboard sheet. This double-face corrugated cardboard sheet will be subjected to various processes such as a folding or turning line formation by using a slitter scorer and will be cut into a predetermined length.

As described above, the preheaters 4 and 14 and the preconditioners 8 are interposed in predetermined positions of the corrugated cardboard producing machine. As shown in FIG. 10, each of the preheaters 4 and 14 and the preheater portions of the preconditioners 8 are structured to supply a steam into a cylindrical roll 17 which is drivingly rotated, thereby heating the interior of the roll 17. Since it is difficult to adjust the heat amount of the roll 17, i.e., the temperature thereof by the supply amount of the steam, a contact length, i.e., a lap amount with the respective single face type cardboard sheets 10 and 11 or the original papers 2 and 9 is adjusted. In other words, large diameter gears 19 and 20 are rotatably mounted on bearing portions of the roll 17 relative to a frame 18, and an adjusting roll 21 is pivoted to the respective gears 19 and 20. The respective gears 19 and 20 are engaged with gears 22 and 23. A rotary shaft 24 of the gears 22 and 23 is connected to a motor 27 through a worm gear 25 and a worm 26. Then, as shown in FIG. 11, the adjusting roll 21 is moved along the outer circumference of the roll 17 by rotating the gears 19 and 20 using the motor 27, to thereby change the lap amount between the roll 17 and the original paper 2, 9 or the single face type corrugated cardboard sheet 10, 11 in accordance with the conditions such as a thickness and a paper quality of the original paper 2, 9 or the single face type corrugated cardboard sheet 10, 11. Thus, the heating amount of the original paper 2, 9 or the single face type corrugated cardboard sheet 10, 11 is set. It is also noted that the preconditioner 8 includes the unit for providing a moisture as well as the above-described heater.

However, in each of the foregoing conventional preheaters 4, 14 and preheater portions of the preconditioners 8, if the adjusting roll 21 is angularly moved in order to change the lap amount with each of the original papers 2, 9 or the single face type corrugated cardboard sheets 10, 11, as is apparent from FIG. 11, a length of the original papers 2, 9 or the single face type corrugated cardboard sheets 10, 11 from guide rolls 28 on the introduction side to the adjusting roll 21 is changed. On the other hand, the recent corrugated cardboard producing machine as a whole is automated by computers. Accordingly, if the length of the original papers 2, 9 and the single face type corrugated cardboard sheets 10, 11 is changed in the preheaters 4, 14 and the preconditioners 8 as described above, a stagnant length is changed as the original papers or the like are stagnant and conveyed on the overhead bridge conveyor 13 in a corrugated and curved manner. The change of the stagnant length causes an error in final production length when a lot changing operation is effected by an order change. For this reason, in the prior art, the angular movement range of the adjusting roll 21 is divided into four parts. In accordance with the situation as to whether or not the adjusting roll 21 for the above-described lap amount falls within any one of the four-divided parts, a suitable correction value substantially corresponds to the length of the original papers 2, 9 or the single face type corrugated cardboard sheets 10, 11 which are changed within the preheaters 4, 14 and the preconditioners 8. The correction value is inputted into the subsequent devices for control. Since the correction value is set only at one of the four parts, the value is rough. Accordingly, if the various devices are controlled in accordance with the correction value, the resultant control involves a large error.

Furthermore, if the stagnant length of the original papers 2, 9 or the single face type corrugated cardboard sheets 10, 11 is changed in correspondence with the lap amount in the preheaters 4, 14 and the preconditioners 8, a tension of the original papers 2, 9 or the single face type corrugated cardboard sheets 10, 11 is also changed. As a result, a position of a dancer roll provided in the splicer 3 or 7 is changed so that the stagnant length within the splicer 3 or 7 which would be inherently controlled as a constant value is changed, and so that as described above, a further error is generated in the final production length. It is also difficult to incorporate, into a softwear of a production control system (not shown) for controlling the subsequent devices such as the overhead bridge conveyor 13, the correcion value representative of any undue length change of the original papers 2, 9 or the single face type corrugated cardboard sheets 10, 11 within the splicers 3, 7.

SUMMARY OF THE INVENTION

Accordingly, in view of the foregoing defects inherent in the prior art, an object of the invention is to provide, in a corrugated cardboard producing machine, a heating amount adjusting device for a preheater, in which, even if the lap amount between the roll of the preheater and an original paper or a single face type corrugated cardboard sheet to be produced into a corrugated cardboard is changed, the introduction length of the sheet into the preheater is kept substantially unchanged, so that it is unnecessary to incorporate the correction value for the introduction length in the subsequent devices as well as the former devices for controlling the various controlling means, thereby reducing the errors in the final production length.

According to the invention, there is provided, in a corrugated cardboard producing machine having at least one preheater for heating a corrugated cardboard sheet of original paper or single face type corrugated cardboard sheet in each of processing stages for producing a corrugated cardboard by bonding a liner paper onto a corrugated central core paper, said machine being characterized in that said preheater includes a lap amount adjusting means whose insertion amount between a circumference of a roll of said preheater and the original paper or the single face type corrugated cardboard is adjustable, said lap amount adjusting means being movable along the circumference of said roll of the preheater.

BRIEF DESCRIPTION OF THE DRAWINGS

The foregoing and other objects, features and advantages of the present invention will become more apparent by the following description in conjunction with the accompanying drawings in which.

DESCRIPTION OF THE PREFERRED EMBODIMENTS

A heating amount adjusting device in accordance with embodiments of the invention will now be described with reference to the accompanying drawings.

Figure 1:
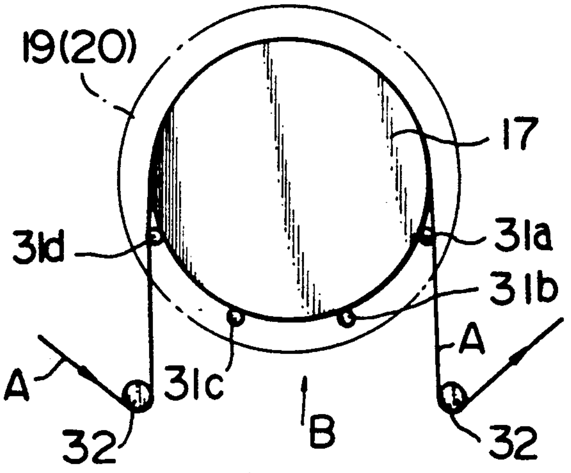
FIG. 1 is a schematic view showing a heating amount adjusting device of a preheater in a corrugated cardboard producing machine in accordance with a first embodiment of the invention, showing a primary part of the structure in the case where the lap amount between the sheet and the roll is kept at a maximum level.
Figure 9:
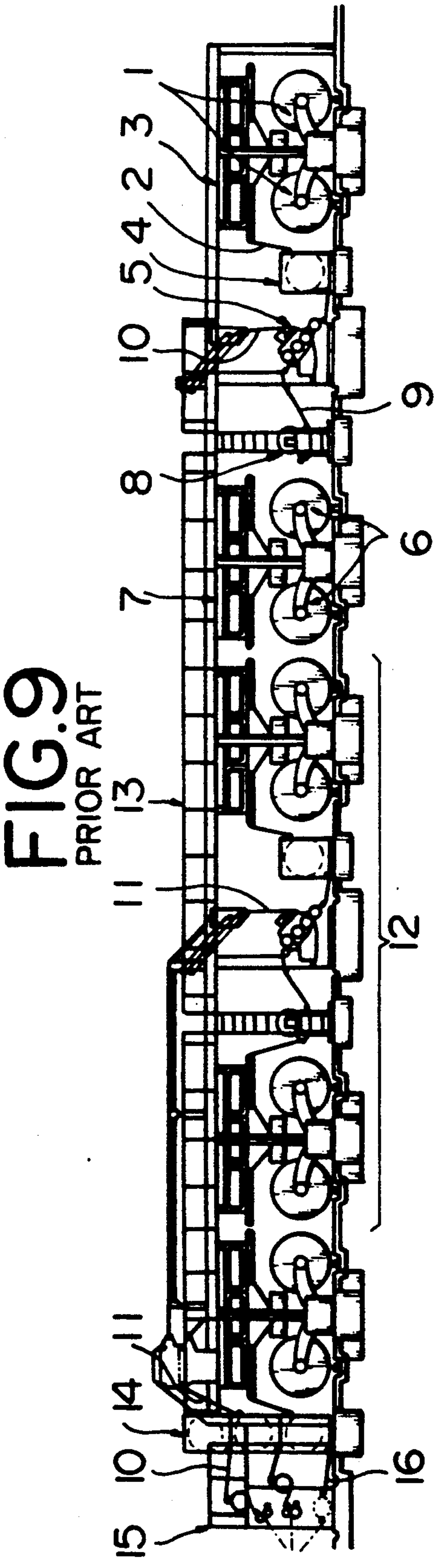
FIG.9 PRIOR ART
FIG. 9 is a schematic view showing an overall corrugated cardboard producing machine according to the prior art.
Figure 10:
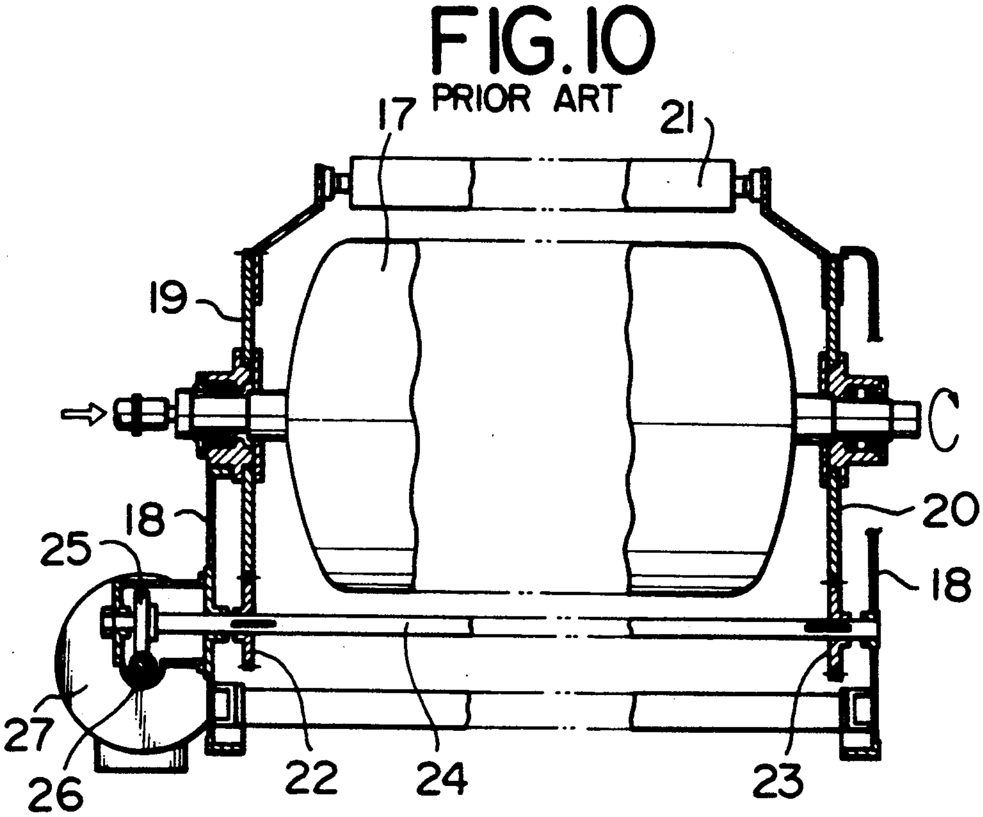
FIG.10 PRIOR ART
FIG. 10 is a schematic view showing a primary part of the preheater according to the prior art.
Figure 11:
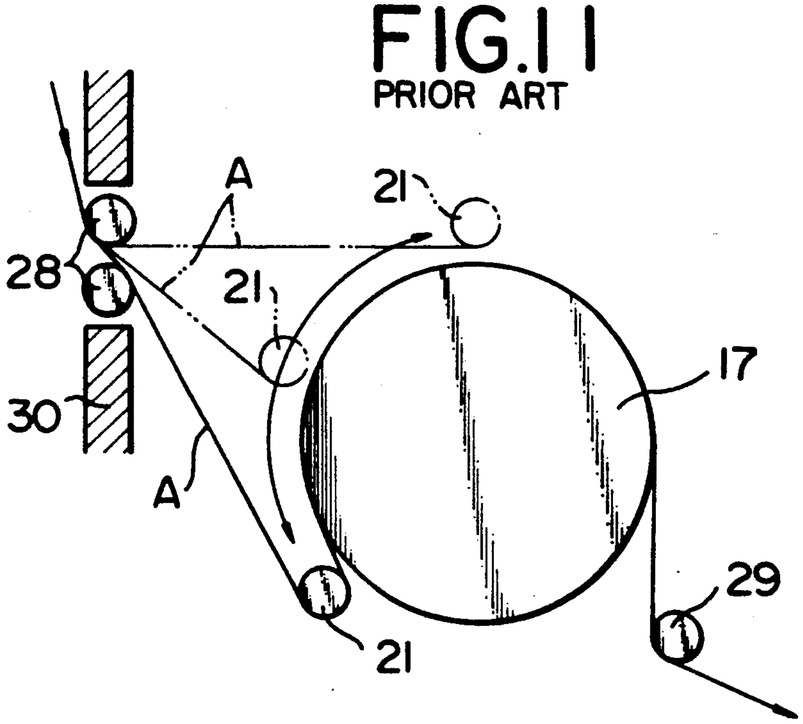
FIG.11 PRIOR ART
FIG. 11 is a schematic view showing a state where the lap amount between the original paper or the single face type corrugated cardboard is changed to change the introduction length of the sheet in the preheater shown in FIG. 10.

FIG. 1 shows a first embodiment in which a reference numeral 17 denotes a roll which is the same as that of the conventional preheater shown in FIG. 9, and reference numerals 19, 20 denote gears which are the same as those of the conventional system. Small diameter rolls 31*a* to 31*d* are equiangularly and rotatably carried between the respective gears 19 and 20. The small diameter rolls 31*a* and 31*d* are arranged so that the distance between the foremost small diameter roll 31*a* and the rearmost small diameter roll 31*d* is somewhat smaller than half the circumference of the roll 17 or equal to the substantially half the circumference. Also, it is preferable that the diameter of the small diameter rolls 31*a* to 31*d* is as small as possible since the change of the length of the original papers or the single face type corrugated cardboard sheets (hereinafter referred to as sheets A) is as small as possible, as described later. It is also preferable that the small diameter rolls are kept out of engagement with the roll 17. However, if the small diameter rolls would be kept in contact with the roll 17, in the case where the small diameter rolls are made of material which is likely to be slidable with respect to the roll 17 or the sheet A, there is no problem. Guide rolls 32 are arranged close to the roll 17 for guiding the introduction and feed-out of the sheet A relative to the roll 17. The guide rolls 32 are carried to the above-described conventional frame 18 to be rotatable but positionally unmovable.

Figure 2:
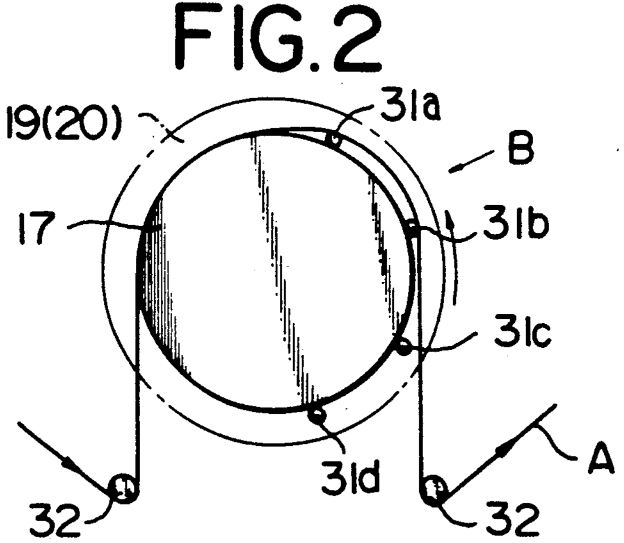
FIG. 2 is a view showing a state where the lap amount is reduced to half the lap amount shown in FIG. 1.
Figure 3:
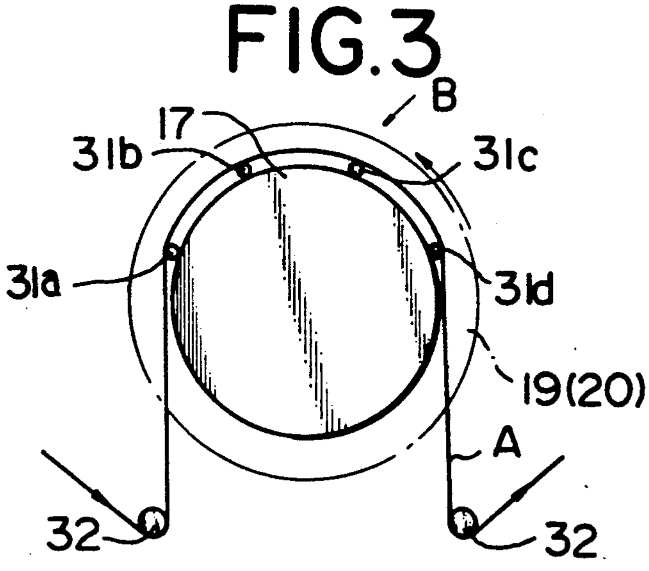
FIG. 3 is a view showing a state where the lap amount is reduced to a zero level relative to the state shown in FIG. 1.

In the case where the heating amount adjusting device for the preheater in accordance with the first embodiment needs a large amount of heat quantity for the sheet A in response to the various condition such as a moisture content, a thickness and paper quality of the sheet A, a temperature of the atmosphere, the humidity thereof and a production rate, the gears 19 and 20 are rotated by the operation of the motor 27 in the same manner as in the prior art so that the device is kept out of contact with the sheet A and the roll 17 as much as possible as shown in FIG. 1. As a result, the contact angle between the roll 17 and the sheet A over the entire circumference angle (360 degrees) is kept at a maximum possible angle that may be adjusted by the small diameter rolls 31*a* to 31*d*, that is, the maximum lap amount. Accordingly, the heating amount which is determined by the lap amount and the production rate of the sheet A is kept at a maximum level. On the other hand, in the case where half the above-described maximum heating amount is desired in accordance with the manufacturing factors such as paper quality of the sheet A, in the same manner as in the prior art, the motor 27 is driven so that the gears 19 and 20 are rotated through about 90 degrees As a result, as shown in FIG. 2, the small diameter rolls 31*a* to 31*d* are rotated through about 90 degrees relative to the center axis of the roll 17, so that the small diameter rolls are interposed between the roll 17 and the sheet A. Thus, it is possible to reduce the lap amount to half the level of the former case, where the sheet A and the roll 17 are in direct contact with each other. Accordingly, the heating amount of the sheet A is half the heating amount at the maximum level determined by the production rate and the like. Also, in the case where it is unnecessary to heat the original paper A by the preheater, as described above, the motor 27 is driven so that the gears 19 and 20 are rotated through 180 degrees from the position of the maximum lap amount. As a result, the small diameter rolls 31*a* to 31*d* are interposed between the roll 17 and the sheet A, so that the sheet A is not in contact with the roll 17 at all. For this reason, the sheet A is not heated by the roll 17 at all, as shown in FIG. 3.

As described above, according to the first embodiment, by rotating the gears 19 and 20 by the action of the motor 27, it is possible to continuously adjust the lap amount between the roll 17 and the sheet A in response to the paper quality, the manufacture condition and the like as desired. It is thus possible to set the heating amount of the sheet A in response to the various conditions such as the paper quality of the sheet A. Even if the heating amount of the sheet A is set as desired, there is the change of the sheet A in the preheater only in correspondence with the change of the length caused by the diameter of the small diameter rolls 31*a* to 31*d* interposed between the sheet A and the roll 17. Therefore, there is no considerable change that is inherent in the prior art and it is unnecessary to input the correction value, corresponding to the change of the sheet A, into the subsequent devices.

Figure 4:
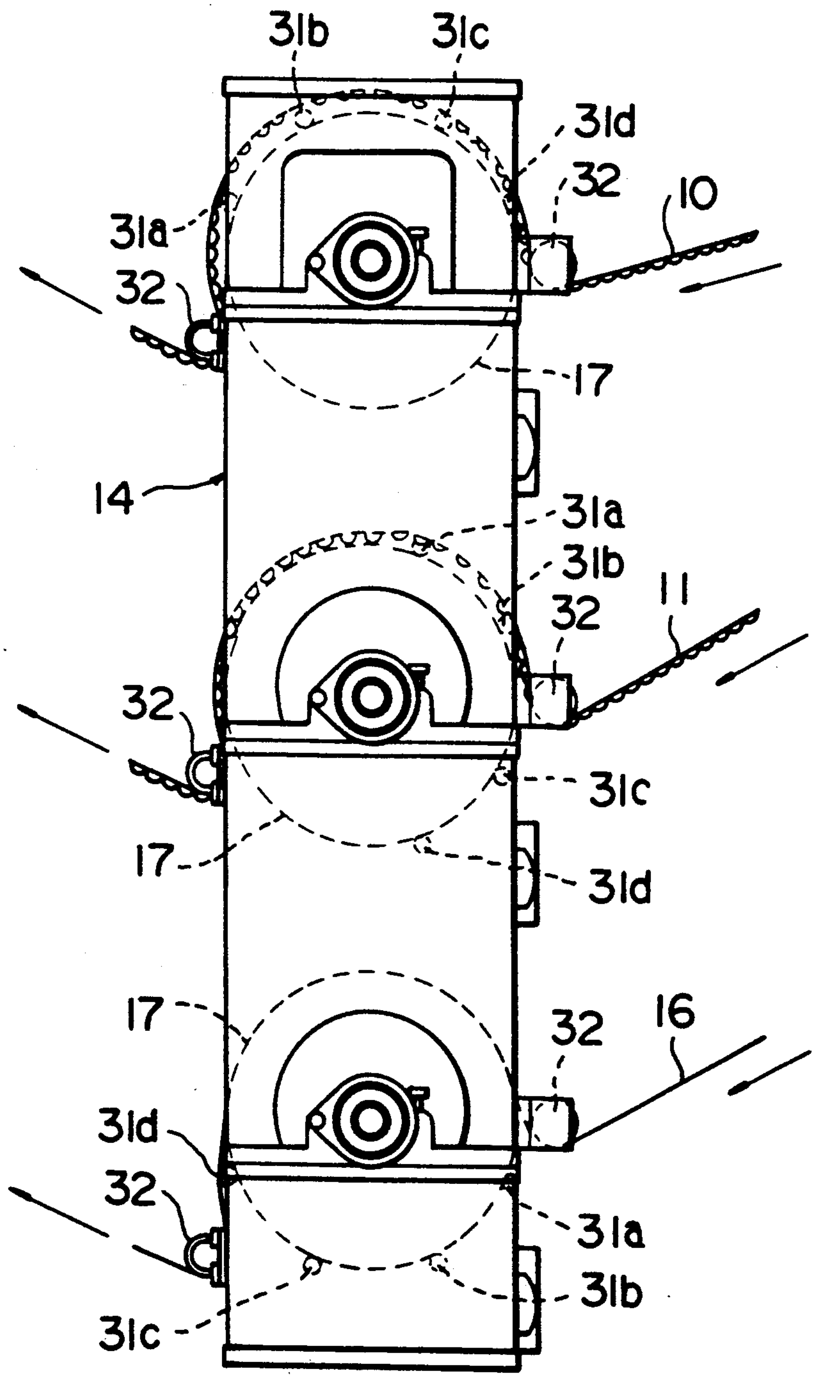
FIG. 4 is a schematic view showing a second embodiment of the invention.

FIG. 4 shows a second embodiment in which the heating amount adjusting device in accordance with the first embodiment is applied to each of the preheaters 14 of the three-stage type shown in FIG. 9. In FIG. 4, there are shown upper small diameter rolls 31*a* to 31*d*, intermediate small diameter rolls 31*a* to 31*d* and lower small diameter rolls 31*a* to 31*d* which are adjusted, respectively, to the minimum position (zero position) the intermediate position and the maximum position of the adjustable lap amount. Namely, of the upper stage rolls, the single face type corrugated cardboard sheet 10 of the sheets A is introduced onto the roll 17 by the guidance of the guide rolls 32 but is not in contact with the roll 17 at all while fed out to the gluing machine 15, since the small diameter rolls 31*a* to 31*d* are located on the upper half circumference of the roll 17. On the other hand, since the intermediate small diameter rolls 31*a* to 31 *d* are adjusted to the position where the small diameter rolls are rotated back through 90 degrees from the position of the upper state small diameter rolls, the single face type corrugated cardboard sheet 11 is heated by the intermediate level between the zero to the maximum value of the adjustable lap amount. Since the lower stage small diameter rolls 31*a* ti 31*d* are located on the lower half circumference of the roll 17, the paper 16 as the line paper is heated at the maximum lap amount between the paper and the roll 17. The upper, intermediate and lower small diameter rolls 31*a* to 31*d* may be independently subjected to position adjustments as desired, so that the desired heating amounts may be obtained for the single face type corrugated cardboard sheets 10, 11 or the original papers 16 of the sheets A by the control of the rotational angles of the gears 19 and 20 in accordance with the various conditions as described above.

Figure 5:
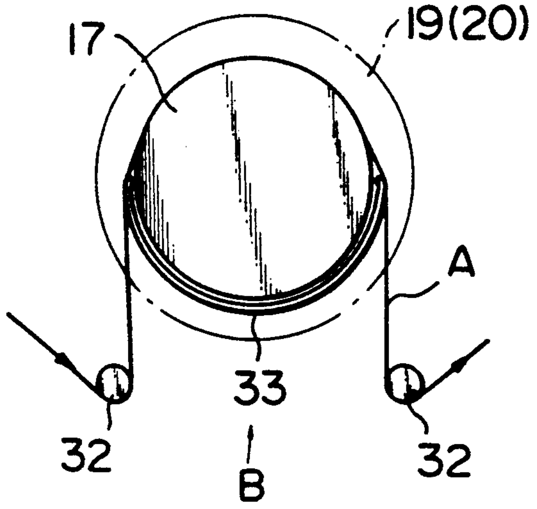
FIG. 5 is a schematic view showing a third embodiment of the invention, in which the lap amount is kept at a maximum level.
Figure 6:
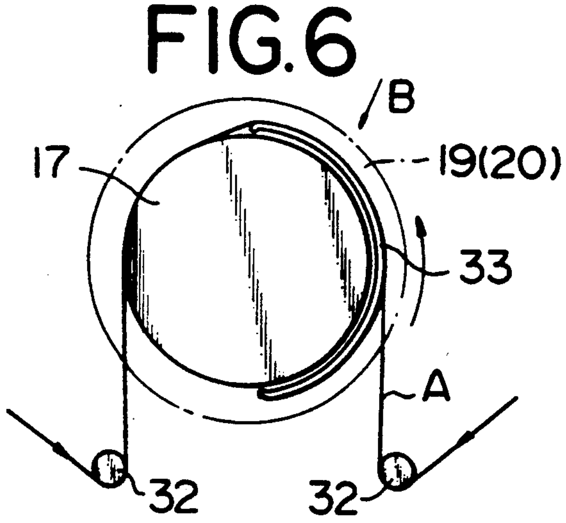
FIG. 6 is a schematic view showing a state where the lap amount is reduced to half the lap amount shown in FIG. 5.
Figure 7:
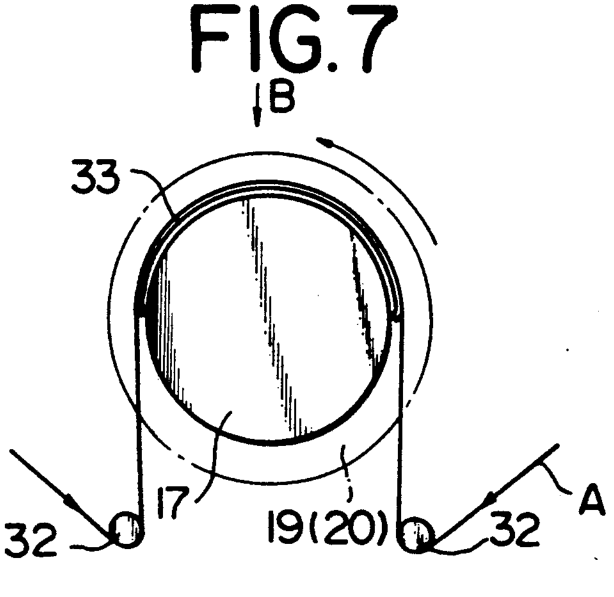
FIG. 7 is a schematic view showing a state where the lap amount is kept at a zero level.

FIGS. 5 through 7 show a third embodiment of the invention. In this embodiment, a half-arcuate shutter blade 33 is used as a lap amount adjusting tool B instead of the small diameter rolls 31*a* to 31*d* in accordance with the first embodiment. The shutter blade 33 is fixed to the gears 19 and 20 so as to cover substantially half the circumference of the roll 17. It is preferable that the shutter blade 33 is made of a material having a possible smallest thickness and that a sufficient gap is provided between the shutter blade 33 and the roll 17. However, if the shutter blade is made of a material having a sufficient heat-resistant property, a sufficient friction-resistance and a sufficient sliding property, it is possible to provide the shutter blade 33 in contact with the roll 17.

In the heating amount adjusting device according to the third embodiment, in the case where the maximum heating amount that may be set for the sheet A in accordance with the various conditions such as the paper quality of the sheet A is needed, the gears 19 and 20 are rotated by the action of the motor 27 in the same manner as in the prior art, so that the shutter blade 33 is kept at the position where the sheet A and the roll 17 are substantially separated from each other. As a result, the lap amount between the sheet A and the roll 17 is kept at a maximum level in the range adjustable by the shutter blade 33. Accordingly, the heating amount of the sheet A is kept at a maximum level determined by the lap amount and the production rate of the sheet A. On the other hand, in the case where the heating amount must be one half of the maximum heating amount in accordance with the various conditions such as the paper quality of the sheet A, in the same manner as in the first embodiment, the motor 27 is driven to rotate the gears 19 and 20 through about 90 degrees, so that as shown in FIG. 6, substantially half the overall portion of the shutter blade 33 is interposed between the sheet A and the roll 17 to thereby reduce the lap amount to half the maximum level between the sheet A and the roll 17. Accordingly, the heating amount of the sheet A is reduced to half the heating amount determined by the ½ lap amount and the production rate of the sheet A. Also, in the case where the sheet A is subjected to no heat, as shown in FIG. 7, if the gears 19 and 20 are rotated by the motor 27 through about 90 degrees from the situation shown in FIG. 6, the shutter blade 33 as a whole is interposed between the sheet A and the roll 17. As a result, the sheet A is not contacted with the roll 17 at all. Thus, the sheet A is not heated by the roll 17 at all.

As described above, it is appreciated that also in the third embodiment, it is possible to adjust, as desired, the lap angle between the sheet A and the roll 17 by the shutter blade 33 from the maximum level to the zero level, whereby it is possible to set, as desired, the heating amount for the sheet A in correpondence with the various conditions such as the paper quality of the sheet A. In addition, according to the third embodiment, even if the heating amount is reset by the shutter blade 33, the length of the sheet A is just changed corresponding to the thickness of the shutter blade 33. This change in length is very small unlike the prior art according to which the correction value must be inputted to the subsequent various devices.

Also, according to the third embodiment, since the lap amount is adjusted by the shutter blade 33, the radiation of heat from the roll 17 is reduced by the shutter blade 33 to thereby suppress the loss of heat of the roll 17 and to keep the heat efficiency at a good level.

Figure 8:
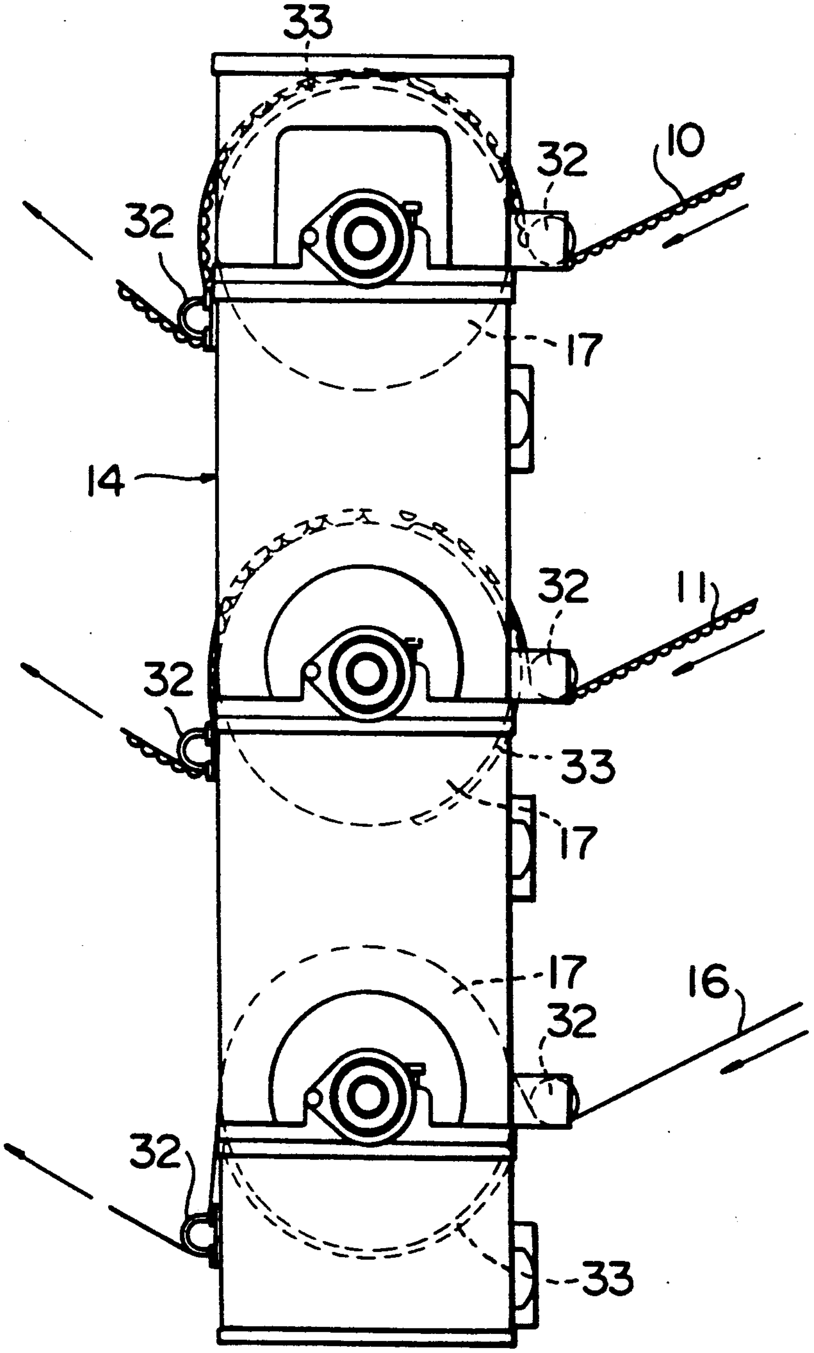
FIG. 8 is a schematic view showing a fourth embodiment of the invention.

FIG. 8 shows a fourth embodiment in which the heating amount adjusting device according to the third embodiment is applied to each of the preheaters 14 of the three-stage type shown in FIG. 9. In FIG. 8, for the sake of explanation, the respective positions of the upper shutter blade 33, the intermediate shutter blade 33 and the lower shutter blade 33 are adjusted to the minimum (zero) position, the intermediate position and the maximum position in the adjustable lap amount range. Namely, in the upper stage, the single face type corrugated cardboard 10 of the sheet A is introduced into the roll 17 but is not heated while fed to the subsequent gluing machine 15 since the shutter blade 33 is located on the upper half circumference of the roll 17 without contacting the single face type corrugated cardboard with the roll 17. On the other hand, the intermediate shutter blade 33 is adjustingly rotated back through about 90 degrees from the upper stage position, whereby the single face type corrugated cardboard is 11 is heated at the intermediate amount between the zero level and the maximum level of the adjustable lap amount. Also, of the lower stage, since the shutter blade 33 is located on the lower half of circumference of the roll 17, the original paper 16 as the liner paper is subjected to the maximum lap amount with the roll 17 and the heating amount is kept at the maximum level in the adjustable range. The shutter blade 33 of the upper, intermediate and lower stages may be independently adjusted by the control of the rotational angle of the gears 19 and 20 so as to obtain the desired heating amounts in conformity with the various conditions for the single face type corrugated cardboard 10, 11 and the original paper 15 of the sheet A, respectively.

It is also apparent that the heating amount adjusting device according to each of the embodiments may be applied to the preheater portion of the preconditioners 8 for controlling both the heating temperature and humidity for the sheet A.

As described above, in the heating amount adjusting device according to the present invention, even if the lap amount between the preheater and the original paper or the single face type corrugated cardboard for the final cardboard is changed, the introduction length of the original paper or the single face type corrugated cardboard into the preheater is kept substantially unchanged. Accordingly, it is unnecessary to incorporate the correction values for the change of the introduction length into the subsequent various devices as well as the former devices. It is thus possible to reduce the error in the final production length.

What is claimed is:

1. A corrugated cardboard producing machine for heating a cardboard sheet in each processing stage of said machine for producing a corrugated cardboard by bonding a liner paper onto a corrugated central core paper comprising:

at least one preheater formed as a roll with a circumference; and a lap amount adjusting means which includes a half-circular arcuate shutter blade covering substantially half a circumference of said roll of said preheater and movable along the circumference of said roll of the preheater to adjust an amount of said roll which comes into contact with said cardboard sheet, said lap amount adjusting means including means for separating said cardboard sheet from said preheater to form an air gap therebetween, an amount of said air gap dependant on a position of said lap amount adjusting means along the circumference of said roll.

2. The machine according to claim 1, further comprising a plurality of preheaters which are operated independently of each other.

3. A corrugated board producing machine according to claim 1 wherein there are a plurality of corrugated board producing machines arranged vertically in alignment, each said corrugated board producing machine including said preheater roll and said half-arcuate shutter blade.

4. A corrugated cardboard producing machine which heats a sheet in each processing stage thereof for producing a corrugated cardboard by bonding a liner paper onto a corrugated central core paper, comprising:

a preheater roll with a heat source provided therein, around which said sheet is wound;

a half-arcuate shutter blade, rotatable concentrically with said preheater roll, said half-arcuate shutter blade providing a space between at least a portion of said preheater roll and said sheet, a size of said portion dependent on a position of rotation of said shutter blade; and a gear concentric with said preheater roll for fixing a position of said half-arcuate shutter blade in parallel with an axial direction of said preheater roll to adjust an amount of said space and an amount of said sheet in contact with said preheater roll.

5. A lap amount adjustable means as claimed in claim 4 in which said half-arcuate shutter blade is non-heat conductive, heat resistive, and has a lower coefficient of friction than said preheater roll.

* * * * *